United States Patent [19]

Chess

[11] 4,072,764

[45] Feb. 7, 1978

[54] EGG YOLK EXTENDER

[75] Inventor: William B. Chess, Monsey, N.Y.

[73] Assignee: Stauffer Chemical Company, Westport, Conn.

[21] Appl. No.: 677,354

[22] Filed: Apr. 15, 1976

[51] Int. Cl.$^2$ .................. A21D 13/08; A23L 1/32
[52] U.S. Cl. .................. 426/558; 426/614; 426/615; 426/622; 426/634; 426/657; 426/553
[58] Field of Search .............. 426/614, 615, 622, 634, 426/602, 550, 555, 558, 93, 94, 96, 21, 19, 657

[56] References Cited

U.S. PATENT DOCUMENTS

| | | | |
|---|---|---|---|
| 1,750,720 | 3/1930 | Matti | 426/19 |
| 1,776,721 | 9/1930 | Bollman | 426/622 X |
| 3,271,164 | 9/1966 | Andt | 426/19 X |
| 3,348,951 | 10/1967 | Evans | 426/21 |
| 3,864,500 | 2/1975 | Lynn | 426/614 |

*Primary Examiner*—Raymond N. Jones
*Assistant Examiner*—R. A. Yoncoskie
*Attorney, Agent, or Firm*—Paul J. Juettner

[57] ABSTRACT

The present invention relates to a composition which can be used to extend egg yolks up to about a 75% replacement on a per weight basis of the yolk replaced depending on the area of use of the yolk without the need of modifying the final recipe by the user. The compositions can be liquid or dry and can be used to replace liquid or dry egg yolks respectively.

45 Claims, No Drawings

EGG YOLK EXTENDER

BACKGROUND

Egg yolk extenders and replacers are well known in the art. They generally comprise various materials of grain or dairy origin in combination with various gums and emulsifiers. It is taught in U.S. Pat. No. 1,762,077, issued June 3, 1930 that lecithin emulsified with food fat can replace egg yolks. Egg yolks can be extended up to 50% by the use of equal parts of egg yolk and lecithin emulsified with twice the amount of water (1 part lecithin - 2 parts water) as is disclosed in British Pat. No. 392,789, accepted May 25, 1933. Alien Property Custodian, 274,000 to Kramers, published May 4, 1943 discloses an egg substitute of casein, lecithin, fatty oils and optionally, a gum. However, it was found in Germany during World War II, that soybean lecithin cannot fully replace egg yolk in baked goods (Kirk-Othmer Encyclopedia of Chemical Technology, 2nd Edition, 1965, Vol. 12, page 356). In addition, most bakers prefer not to use lecithin because it is sticky and difficult to handle.

Egg yolks have also been extended for use in some areas by the use of full fat soy flour. The main problem with the use of full fat soy flour is the inability of the baker to replace the egg yolk in his recipe on an equal weight basis without modification of the recipe. Full fat soy flour is unusable as a general egg yolk extender.

Generally, use of egg yolk extenders requires a modification of the recipe to obtain the required functional replacement of the egg yolk. The egg yolk extender should provide the emulsification and water binding characteristics of the egg yolk replaced. If the water binding characteristics are different from egg yolk, the baker's recipe will require modification in the amount of liquid added.

Since egg yolk provides various functions, one or more of which may be required in any specific recipe, the formulation of a general egg yolk extender requires consideration of all the areas in which egg yolk is useful and the functions which it performs in those areas. Most known egg yolk extenders do not provide the generality of use desirable. Thus, the use of some egg yolk extenders is limited. It would be commercially desirable to provide an egg yolk extender which can be used to replace egg yolk on an equal weight and functional basis without the need for modifying the recipe with regard to critical aspects such the water content.

These problems have been overcome with a formulated composition of numerous ingredients as disclosed in Lynn U.S. Pat. No. 3,864,500, issued Feb. 4, 1975 (Application Ser. No.: 381,416, filed July 23, 1973, which was a CIP of Ser. No. 144,228, filed May 17, 1971). Lynn requires the use of a high protein material as the starting material for his egg extender composition. The high protein material is prepared in accordance with Lynn U.S. Pat. No. 3,697,290 issued Oct. 10, 1972 (Ser. No. 879,717, filed Nov. 25, 1969, which was a CIP of Ser. No. 846,428, filed July 31, 1969). The high protein material is prepared by a process including the steps of:

1. simmering a non-elastic protein material such as sesame flour in salted oil;
2. adding a mild acid such as citric acid to bring out flavor;
3. adding water, vegetables, followed by boiling;
4. adding additional water and non-elastic protein material (sesame) and continued boiling; and
5. adding a thickening agent, continuing boiling to form the high protein material.

To this is then added a food grade emulsifier; an appearance agent or spice mix containing coloring agents such as carotene, turmeric and annatto; texturizing agents such as alginates or carrageenan; lecithin and a neutralizer such as sodium bicarbonate. It is taught in the Lynn patent that this material will effectively extend egg yolk. However, this material has certain disadvantages in that it requires the use of a starting material which must be prepared by a complicated time consuming and, therefore, costly process. It would be more advantageous if an egg yolk extender could be prepared using a less complex process.

THE INVENTION

In accordance with the present invention, it has been found that an improved egg yolk extender which is capable of being used in many formulations can be inexpensively and easily provided by combining full fat soy flour, grain flour and lecithin in a ratio of grain flour: full fat soy flour within the range of from about 1:10 to about 1:1, and lecithin in a ratio of lecithin: full fat soy flour within the range of from about 1:100 to 20:100. This composition can effectively extend egg yolks when used in an amount of up to about 75% and preferably up to about 50% egg yolk replacement depending on the area of use of the yolk.

The compositions of the present invention can be used as such in the dry state as an egg yolk extender for dried egg yolks. Also, the compositions of the present invention can be mixed with equal amounts by weight of water to form a liquid egg yolk extender. The invention is intended to cover compositions in both the dry and liquid state.

The composition of the present invention more nearly approximates the functional characteristics of egg yolk replaced when used on a per weight replacement basis. The composition of the present invention can be easily and inexpensively prepared.

All parts and ratios given herein are on a weight basis unless otherwise indicated.

Full fat soy flour is a common item of commerce. One of the methods of preparing this material includes steam treating soybeans to crack the beans to allow the enzymes which are characteristic of the beany taste of the soybean to be removed. After removal of the enzymes, the cracked beans are ground into flour without removing any of the soybean oil. There are many methods of neutralizing the enzymes prior to milling which are operative in preparing the full fat soy flour used in the present invention. Full fat soy flour is commercially available as an article of commerce.

The full fat soy flour is critical in the present invention inasmuch as defatted soy flour cannot be used in place thereof. The use of defatted soy flour and soy oil as a replacement for the full fat soy flour does not provide as effective a product.

The full fat soy flour is blended with a grain flour in a ratio of grain flour: full fat soy flour within the range of from about 1:10 to about 1:1. The flour can be from any commercial source as long as the flour is of fine particle size (less than about 150 mesh). The flour can come from any grain source such as corn, wheat, rye, oats, and the like and mixtures thereof. Preferably, the grain flour is derived from wheat. Short patent wheat flour is preferred. The grain flour is desirably blended with the full fat soy flour prior to blending additional ingredients.

If it is desired to cut the amount of flour used, a filler can be used for that purpose. Though the use of a filler is not preferred, one can use a material such as corn syrup solids as a filler. Up to 50% of the flour may be replaced with the filler without seriously harming the results achieved. The use of a filler is conditioned upon the limitation that the absorptive characteristics required of the product in the area of use are not seriously altered.

Lecithin is a well-known article of commerce. It basically comprises a group of phosphatides obtained from various materials such as soybean, cotton seed, rape seed, castor seed, peanut and coffee as well as egg. While all the lecithins obtained from these sources can be used, the least expensive and most readily available lecithin, the lecithin of commerce, is soybean lecithin. This is the preferred source of the lecithin used in the present invention.

Soybean lecithin or commercial lecithin is available in many grades which include unbleached, single bleached and double bleached. Lecithin is also available in various fluid consistencies, it having been found that lecithin can be diluted with oils and fatty acids. The preferred lecithin is unbleached commercial lecithin.

The lecithin is used in an amount sufficient to provide a ratio of lecithin to full fat soy flour within the range of from about 1:100 to about 20:100. Preferably, the ratio of lecithin to full fat soy flour is within the range of from about 1:20 to about 3:20.

The lecithin is usually heated to a temperature within the range of from about 40°–60° C. to increase its fluidity to facilitate its admixture with the other ingredients.

The compositions of the present invention can be prepared by incrementally blending lecithin which is heated to a temperature within the range of from about 40° to about 60° C. with a mixture of full fat soy flour and grain flour with agitation. The lecithin is added incrementally so that it can be fully absorbed into the flour as it is mixed. After the materials are thoroughly blended in the desired proportions, the blend is milled to disperse any soft lumps which may be formed. A high speed hammer mill such as a Fitzmill™ has been found to be effective for this purpose. It is preferred that the milled particles be 60 mesh or finer. Particles substantially coarser than this will not provide the effective results desired.

The compositions of the present invention can be used as effective replacements for up to 75% and preferably up to about 50% of the egg yolk in baked goods depending on the areas of use of the yolk. The egg yolk can be replaced on a per weight basis in either the liquid or dry form depending on the requirements of the recipe. The compositions of the present invention can be utilized to extend egg yolk in liquid whole eggs, dried whole eggs, or dried and liquid egg yolk. Since most commercial bakers tend to use whole eggs, it is preferred to replace the egg yolk on that basis in a composition including egg yolk and albumen as will be described more fully hereinafter.

While the blend of full fat soy flour, grain flour and lecithin can be used as such as an effective egg yolk extender, it has been found desirable to include additional ingredients with the aforementioned blend to expand the range of usefulness and provide a product more fully adapted to extend egg yolk on a per weight basis of the yolk replaced.

It has been found desirable to include a humectant in the blend. The humectant retains moisture in the final product and acts to inactivate or tie-up the moisture needed for bacteriological growth. Suitable humectants are any of the food grade polyols such as glycerin, sorbitol, mannitol, or propylene glycol. It is preferred to utilize glycerin. The humectant is used in an amount of from about 1 to about 12 parts per 100 parts of full fat soy flour. More preferably, the humectant is used in an amount of from about 5 to about 10 parts per 100 parts of the full fat soy flour.

It has also been found desirable to add from about 0.5 and preferably from about 1 to about 3 parts per 100 parts of full fat soy flour of a gum. The gum adds to the viscosity of the batters and assists in retaining gases as they are formed in the baking process. It has been found that the structural quality of cakes decreases as the amount of gum utilized decreases. The end result of using gum in the blend of the present invention is a better grain structure in the baked goods. Gums which can be used include alginates, such as sodium or potassium alginate, guar, xanthan, carrageenan and the like. The preferred gum is a carrageenan. Since the gums are natural products, each gum may not provide exactly equal results. Some variation may be required in the amount of gum utilized. The determination of this amount is well within the ability of one skilled in the art.

It has also been found desirable to include within the egg yolk extender composition of the present invention a food grade emulsifier other than lecithin. Such food grade emulsifiers are typically mono- and diglycerides, propylene glycol fatty acid esters, polyglycerol fatty acid esters, sorbitan monostearate, polyoxyethylene sorbitan fatty acids such as polyoxyethylene sorbitan monostearate, sodium stearoyl-2-lactylate, dioctyl sodium sulfosuccinate, and the like and mixtures thereof. The preferred emulsifiers included polyoxyethylene sorbitan monostearate and polyglycerol fatty acid esters. Mixtures of emulsifiers are also effective. Illustrative of such mixtures is the combination of propylene glycol fatty acid esters with mono and diglycerides. These emulsifiers serve the purpose of binding water and oil systems in the blend and add aeration qualities to the egg yolk extender. These emulsifiers in general are available in various forms such as liquid, viscous liquid, powder, flake, granule, bead, solid and paste though any particular one might not be available in all forms. The original lecithin alone is sufficient when used in those cases where aeration is not required. Preferably, it is desirable to use the combination of lecithin with the food grade emulsifiers to make the egg yolk extender a product of more general applicability. The food grade emulsifier can be used in the range of from about 1 part to about 12 parts per 100 parts of full fat soy flour. A preferred range is from about 2 parts to about 4 parts per 100 parts of the full fat soy flour.

While the previously listed emulsifiers are preferred, a wide range of food grade emulsifiers can be used such as those listed under "Emulsifiers: Whipping and Foaming Agents" on page 1013, of a book entitled: FOODS, CHEMICALS CODEX, 2nd Edition, published by the National Academy of Science, Washington, D.C. 1972 and the supplements thereto. That list of emulsifiers including those listed in the supplements is incorporated herein by reference.

In order to provide a properly colored egg yolk extender, an appearance agent in the form of a spice mix is added. These compositions are commercially available from spice houses and typically include wheat flour which acts as a carrier for other ingredients including spices; typically carotene, turmeric and annatto which are included principally to give the egg yolk extender a desirable yellow color. The amount of spice mix utilized is dependent on the color desired. An operable range for the spice mix is up to about 15 parts per 100 parts of full fat soy flour with a preferred range being from about 7 to about 9 parts per 100 parts of full fat soy flour. These amounts can vary slightly depending upon the amount and type of spice used to form the spice mix.

The spice mixes are readily available on the commercial market and can be used as outlined hereinbefore. If it is desired to utilize the spice alone, the carotene, turmeric, and annatto can be blended with the egg yolk extender to provide the desired yellow color.

If it is desired to dilute the final egg yolk extender of the present invention, one can add corn syrup solids to the final blend. This is not preferred though it can be used effectively to reduce the overall cost. An amount of corn syrup solids within the range of from about 5 to about 15 parts corn syrup solids per 100 parts of the final product can be used.

The egg yolk extender of the present invention is generally prepared by mixing the full fat soy flour with the wheat flour followed by blending therewith lecithin which has been made fluid by heating. Mixing can be accomplished at ambient temperature. If desired, all of the additional emulsifiers can be added with the lecithin. If the emulsifier is a solid other than a finely divided material defined as less than about 60 mesh, or a viscous fluid, it can be liquefied in the heated lecithin and added to the blend at this point with the lecithin.

A humectant, such as glycerin, is then preferably physically blended with the full fat soy flour, grain flour and lecithin mixture.

If a liquid or finely powdered, less than about 60 mesh, emulsifier is used, it can be blended with the mixture at this point. A particularly effective emulsifier for this system is polyoxyethylene sorbitan monostearate which is a liquid and which can be added at this point.

The product can then be blended with some or all of the following ingredients: a gum such as carrageenan, and if desired, corn syrup solids, and coloring and flavoring ingredients (spice mix). After thorough blending, the product is milled, if necessary, to provide a particle size of less than about 60 mesh. The product, which is in the form of dry stable agglomerated particles, can then be bagged for shipment.

The essentials of the process are thorough uniform mixing of all ingredients and a fine agglomerated particle size which can be achieved by milling.

The egg yolk extenders of the present invention can be utilized in any area where egg yolks are normally used such as yellow cake, sponge cake, devils food cake, donuts, cookies, sweet doughs and salad dressings. The egg yolk extenders can be used in liquid or dry form as the recipe requires.

The product of the present invention can be sold as prepared or mixed with liquid or dried egg whole egg powder and albumen and if necessary water to provide a whole egg extender. The compositions can be liquid, dried or frozen as desired. These compositions provide the taste, texture, appearance and functional properties which closely match those of egg yolks in a wide range of applications.

In food products requiring egg yolks, the egg yolk extender of the present invention can be used to replace up to about 75% of the egg yolk depending on the area of use of the egg yolk. Some recipes, such as cookies, are not as sensitive as others to egg functionality. In those areas, replacement of egg yolk up to about 75% can be achieved. In areas more sensitive to the presence of egg yolk, replacement of about 45% to about 55% yolk is recommended. For general purpose use, it is recommended that only up to 50% of the egg yolk be replaced.

Thus, the egg yolk requirement in a recipe can be satisfied with from about 25 to 100 parts egg yolk and 75 to 0 parts of the composition of the invention. It is preferred that the amounts range from about 25 parts to about 75 parts egg yolk to from about 75 parts to about 25 parts egg yolk extender of the invention. It is more preferred that the aforementioned amounts range from about 45 to about 55 parts egg yolk and from about 55 to about 45 parts composition of the present invention. The aforementioned ratio of material can be achieved by the baker during the preparation of a batter or a product comprising egg yolk and the egg yolk extender of the present invention which falls within the aforementioned limitations can be prepared and sold to the baker. The latter can be used to satisfy the egg yolk requirements of a recipe on a per weight basis. For purposes of this specification, this product of egg yolks and the egg yolk extender is referred to as an egg yolk replacer.

The egg yolk replacer can be liquid or dry. If a liquid egg yolk replacer is desired, liquid or liquefied egg yolks are mixed with dry egg yolk extender and water in a ratio of approximately 2:1:1.

Percentages and parts apply equally to liquid or dry egg yolk replacers.

The dry compositions of the present invention can also be used to replace egg yolk in dry whole eggs. An extended dry whole egg composition can be prepared using from about 60 to about 80 parts by weight egg yolk extender and, correspondingly, from about 40 to about 20 parts by weight albumen. The baker can use formulations of this type for direct replacement of dry eggs up to 75% and preferably from about 45 to 55% egg yolk replacement. If it is desired to prepare a composition which can be used directly to satisfy the dry whole egg requirement of a recipe, one can blend as little as 25 parts whole egg solids, as much as 52.5 parts egg yolk extender, the remaining 22.5 parts being albumen, all percentages being on a dry basis. A replacer for dry whole eggs comprising egg yolk, egg yolk extender and albumen would have a minimum of about 17.5 parts yolk and a maximum of about 52.5 parts egg yolk extender and about 30 parts albumen. An extended dry whole egg replacer can be thus prepared using from about 17.5 to about 52.5 parts by weight of the product of the invention and from about 52.5 to about 17.5 parts by weight egg yolk per 30 parts of albumen. Materials falling within these limits can be prepared by the baker in situ in the batter or prepared as a separate product which can be used by the baker as whole eggs in a recipe. The term whole egg replacer, as used herein, is intended to cover a product of egg yolk, egg yolk extender and albumen prepared as a liquid and dried or dry, all parts being by weight.

The egg yolk extender can also be used in preparing a liquid whole egg extender. This composition would include about 20% dry extender, about 20% water and about 60% albumen. This composition can be used by a baker or other use to replace up to 50% of the liquid whole egg requirement of his recipe.

The egg yolk extender can also be used in preparing a liquid whole egg replacer. A suggested formulation includes 50% liquid whole egg, 10% egg yolk extender, 10% water and 30% albumen. This product can also be made from liquid egg yolk using 20% liquid egg yolk, 10% egg yolk extender, 10% water and 60% albumen. These compositions can be used as such or frozen to facilitate shipment. These compositions can be used to replace up to 100% of the liquid whole eggs requirement of a recipe. These compositions can also be dried to form dry whole egg replacers. In this case, it is not necessary to add an amount of water equivalent to the egg yolk extender.

The following examples are included to aid in the understanding of the invention and variations may be made by one skilled in the art without departing from the spirit and the scope of the invention.

Slowly add while mixing 9.07 kg (4%) lecithin which has been preheated to about 40° C. After the lecithin is thoroughly mixed with the flour, slowly add with mixing 6.8 kg (3%) glycerin (U.S.P.). To this blend is added with mixing 4.54 kg (2%) polysorbate 60 which is a polyoxyethylene sorbitan monostearate sold under the tradename Tween 60. After the emulsifier is thoroughly blended, there is added with mixing 1.13 kg (0.5%) carrageenan (Carastay®26 from Stauffer Chemical Company, Westport, Connecticut) and 11.34 kg (5%) of a spice mix ("Basic Spice Mix" Basic Foods). The product is then milled in a "Fitzmill TM" hammer mill and packaged in bags or drums. The total yield of product is 226.8 kg of dry product.

EXAMPLES 2, 3 & 4

Using the egg yolk extender prepared by the method of Example 1, yellow, sponge and devils food cakes were prepared according to the following formulations:

| YELLOW CAKE FORMULATION | | | | | |
|---|---|---|---|---|---|
| Ingredients: | | | Mixing Procedure: | | |
| Sugar | 345 | gm | Mix dry ingredients; add emulsifier and shortening. Add 180 cc water. Mix - scrape at each interval. | | |
| Cake Flour | 300 | gm | | | |
| Salt | 6 | gm | | Minutes | Speed |
| Baking Powder | 15 | gm | | 1 | low |
| NFDM Superheat | 24 | gm | | 1 | med. |
| Whole Dry Egg | 25 | gm | | 2 | med. |
| Egg Yolk Extender of Example 1 | 17.5 | gm | Add 90 cc water | | |
| Egg Albumen | 7.5 | gm | | 1 | low |
| Creamtex* Cake Shortening | 108 | gm | | 1 | med. |
| Atmul** 80 Cake Emulsifier (mono - diglycerides) | 12 | gm | | 2 | med. |
| Water - 1st stage | 180 | cc | Add 90 cc water | | |
| 2nd stage | 90 | cc | | | |
| 3rd stage | 90 | cc | Scale 400 gm Specific gravity .85–.90 Bake at 350° F for 32 min. | 1 1 | low low |

*Reg. TM, SCM Corp.
**Reg. TM, ICI United States, Inc.

EXAMPLE 1

Preparation of Egg Yolk Extender

Into a ribbon blender, place 146.29 kg (64.5%) full fat soy flour and 45.36 kg (20%) short patent wheat flour.

| SPONGE CAKE FORMULATION | | | | | |
|---|---|---|---|---|---|
| Ingredients: | | | Mixing Procedure: | | |
| Cake Flour | 400 | gm | Use Hobart Model C-100 with 3 qt. bowl and wire whip. | | |
| Sugar | 480 | gm | Place all dry ingredients in bowl with emulsifier and water for 1st stage mix as follows scraping bowl secreal times. | | |
| NFDM Superheat | 30 | gm | | | |
| Salt | 12 | gm | Add 280 cc ice water plus 2 cc vanilla. Mix - scrape at each interval. | | |
| Baking Powder | 11 | gm | | | |
| | | | | Minutes | Speed |
| Atmos*2462 Emulsifier** | 20 | gm | | ½ | low |
| | | | | 1 | med. |
| Dried Egg Yolk | 24.5 | gm | | 3 | high |
| | | | Add 200 cc water | 3 | high |
| Egg Yolk Extender (Example 1) | 24.5 | gm | | | |
| | | | | ½ | low |
| Egg Albumen | 21 | gm | | 2 | med. |
| | | | | 4 | low |
| Water - 1st stage | 280 | cc | If specific gravity of .510–.525 has not been obtained, mix an additional 30 sec. at 3rd speed. Scale 283 gms. into 6 ½" ungreased tube pans. Bake at 375° for 30 min. | 2 | med. |
| 2nd stage | 200 | cc | | | |

***Reg. TM, ICI United States, Inc.
****Atmos 2462 - a combination of hydrated mono and diglycerides, polysorbate 60 & sorbitan monostearate

| DEVILS FOOD CAKE | | | |
|---|---|---|---|
| Ingredients: | | Mixing Procedure: | |
| Sugar | 304 gm | Mix dry ingredients; add emulsifier and shortening. | |
| Cake Flour | 252 gm | Add 160 cc ice water. Mix - scrape at each interval. | |
| | | Minutes | Speed |
| NFDM Superheat | 21 gm | 1 | low |
| | | 1 | med. |
| Cocoa - Dutch Process | 35 gm | 1½ | med. |
| | | Add 100 cc water | |
| Salt | 5 gm | 1 | low |
| | | 1 | med. |
| Baiing Powder | 10 gm | 1½ | med. |
| | | Add 100 cc water | |
| Bicarbonate of soda | 4 gm | 1 | low |
| | | 1 | low |
| Egg Yolk Solids | 14 gm | Scale 400 gm | |
| | | Specific gravity .90–.93 | |
| Egg Yolk Extender of Example 1 | 14 gm | Bake at 360° for 27 min. | |
| Egg Albumen | 12 gm | | |
| Creamtex cake shortening | 83 gm | | |
| Atmos 2462 Emulsifier**** | 7 gm | | |
| Water - 1st stage | 160 cc | | |
| 2nd stage | 100 cc | | |
| 3rd stage | 100 cc | | |

****Atmos 2462 - a combination of hydrated mono and diglycerides polysorbate 60 & sorbitan monostearate Controls were prepared using egg yolk solids in place of the egg yolk extender. The test cakes were judged equivalent to the controls in flavor, strength, structure, color and over-all appearance. The specific volume of the sponge cake was slightly less than the control. Equivalent results were obtained using egg yolk extenders prepared according to the process of Example 1 using as emulsifiers in place of polysorbate 60, polyglycerol fatty acid esters or mixtures of propylene glycol fatty acid esters with mono and dioglycerides.

EXAMPLE 5

Using the egg yolk extender prepared by the method of Example 1, a salad dressing was prepared according to the following formulation:

| SALAD DRESSING FORMULATION | |
|---|---|
| | Percent |
| Soybean oil | 80.55 |
| Water | 6.66 |
| Cider Vinegar | 6.66 |
| Egg Yolk Solids | 1.74 |
| Egg Yolk Extender of Example 1 | 1.74 |
| Salt | 1.40 |
| Sugar | 1.10 |
| Dry Mustard Powder | .15 |
| | 100.00 |

The water was placed in a mixer. The dry ingredients were added and mixed until just blended. A small portion of oil was added very slowly and then the vinegar, was added with mixing. The remaining oil was then added very slowly with mixing.

The salad dressing thus prepared was compared to a control prepared using egg yolk in place of the egg yolk extender. The test salad dressing was equivalent to the control in body, flavor and appearance. After a one month storage stability test, no separation of oils or other ingredients had taken place in either sample.

As used herein, all screen sizes are U.S. Standard Sieve Series (1940).

What is claimed is:

1. An egg yolk extender comprising full fat soy flour, a grain flour, lecithin, said grain flour being present in a ratio to said full fat soy flour within the range of from about 1:10 to about 1:1 and said lecithin being present in a ratio to said full fat soy flour within the range of from about 1:100 to about 20:100, all ratios being on a weight basis and from about 1 to about 12 parts of a food grade emulsifier other than lecithin and from about 1 to about 12 parts of a humectant, said parts being by weight per 100 parts of full fat soy flour.

2. The egg yolk extender as recited in claim 1 wherein said humectant is a food grade polyhydric alcohol.

3. The egg yolk extender as recited in claim 2 wherein said polyhydric alcohol is glycerin.

4. The egg yolk extender as recited in claim 1 wherein said food grade emulsifier is selected from the group consisting of mono- and diglycerides, propylene glycol fatty acid esters, polyglycerol fatty acid esters, sorbitan monostearate, polyoxyethylene sorbitan fatty acid esters, sodium stearoyl-2-lactylate, dioctylsodium sulfosuccinate, polyoxyethylene sorbitan monostearate and mixtures thereof.

5. The egg yolk extender as recited in claim 1 wherein said food grade emulsifier is polyoxyethylene sorbitan monostearate.

6. The egg yolk extender as recited in claim 1 wherein said food grade emulsifier is propylene glycol fatty acid esters mixed with mono and diglycerides.

7. The egg yolk extender as recited in claim 1 wherein said food grade emulsifier is polyglycerol fatty acid esters.

8. An egg yolk extender comprising full fat soy flour, a grain flour, lecithin, said grain flour being present in a ratio to said full fat soy flour within the range of from about 1:10 to about 1:1 and said lecithin being present in a ratio to said full fat soy flour within the range of from about 1:100 to about 20:100, all ratios being on a weight basis and from about 1 to about 12 parts of a food grade emulsifier other than lecithin and from about 0.5 parts to about 3 parts of a food grade gum, said parts being by weight per 100 parts of full fat soy flour.

9. The egg yolk extender as recited in claim 8 wherein said food grade gum is selected from the group consisting of alginates, carrageenan, guar, xanthan and mixtures thereof.

10. The egg yolk extender as recited in claim 9 wherein said gum is carrageenan.

11. A whole egg extender comprising from about 60 parts to about 80 parts by weight of the product of claim 8 and from about 40 parts to about 20 parts by weight albumen, all parts being on a weight basis.

12. A liquid whole egg extender comprising in admixture, about 20% of the dry product of claim 8, about 20% water and about 60% albumen.

13. The egg yolk extender as recited in claim 1 which further includes from about 0.5 parts to about 3 parts by weight per 100 parts of said full fat soy flour of a food grade gum.

14. The egg yolk extender as recited in claim 13 wherein said food grade gum is selected from the group consisting of alginates, carrageenan, guar, xanthan and mixtures thereof.

15. The egg yolk extender as recited in claim 14 wherein said humectant is glycerin.

16. An egg yolk extender comprising:
A. full fat soy flour;
B. wheat flour in a ratio to said full fat soy flour within the range of from about 1:10 to about 1:1;
C. lecithin in a ratio to said full fat soy flour within the range of from about 1:100 to about 20:100;
D. a humectant in an amount of from about 1 part to about 12 parts per 100 parts full fat soy flour;
E. a food grade emulsifier other than lecithin in an amount of from about 1 to about 12 parts per 100 parts full fat soy flour; and
F. carrageenan in an amount of from about 0.5 parts to about 3 parts per 100 parts full fat soy flour; all parts and ratios being on a weight basis.

17. The egg yolk extender as recited in claim 16 wherein said humectant is glycerin.

18. The egg yolk extender as recited in claim 16 wherein said emulsifier is polyoxyethylene sorbitan monostearate.

19. The egg yolk extender as recited in claim 16 wherein said emulsifier is propylene glycol fatty acid esters mixed with mono and diglycerides.

20. The egg yolk extender as recited in claim 16 wherein said emulsifier is polyglycerol fatty acid esters.

21. The egg yolk extender as recited in claim 16 which further includes an appearance agent.

22. The egg yolk extender as recited in claim 1 which further includes corn syrup solids as a replacement for up to 50% by weight of said grain flour.

23. A process for preparing an egg yolk extender comprising:
A. forming a mixture of full fat soy flour and grain flour;
B. heating lecithin to a temperature within the range of between about 40° C and about 60° C to make the same fluid;
C. incrementally blending said heated lecithin with said flour mixture at a rate sufficient to allow said lecithin to be absorbed into said flour, and;
D. milling the product of step C until particles of 60 mesh or finer are obtained, said grain flour being present in an amount in a ratio to said full fat soy flour within the range of from about 1:10 to about 1:1, and said lecithin being present in an amount in a ratio to said full fat soy flour within the range of from about 1:100 to about 20:100 all parts and ratios being on a weight basis.

24. The process as recited in claim 23 which further includes the step of admixing a humectant with the product of step C in an amount of from about 1 part to about 12 parts per 100 parts of said full fat soy flour.

25. The process as recited in claim 23 wherein said grain flour is wheat flour.

26. The process as recited in claim 24 wherein said humectant is glycerin.

27. The process as recited in claim 23 which further includes admixing with the product of step C a gum in the amount of from about 0.5 parts to about 3 parts per 100 parts of said full fat soy flour and from about 1 part to about 12 parts per 100 parts of said full fat soy flour of a liquid or a solid powdered food grade emulsifier, said solid emulsifier being of less than about 60 mesh, all parts being on a weight basis.

28. The process as recited in claim 27 wherein said gum is carrageenan.

29. The process as recited in claim 23 which further includes the step of admixing from about 1 part to about 12 parts per 100 parts of said full fat soy flour of a food grade emulsifier with said heated lecithin to form a blend of said lecithin and said emulsifier followed by adding said blend to the flour mixture per step C.

30. The process as recited in claim 29 wherein said emulsifier is a solid of greater than 60 mesh.

31. The process as recited in claim 29 wherein the emulsifier is selected from the group consisting of mono- and diglycerides, propylene glycol fatty acid esters, polyglycerol fatty acid esters, sorbitan monostearate, polyoxyethylene sorbitan fatty acid esters, dioctyl sodium sulfosuccinate, sodium stearoyl-2-lactylate, polyoxyethylene sorbitan monostearate and mixtures thereof.

32. The process as recited in claim 31 which includes the further step of admixing an appearance agent with the product of step C.

33. The process as recited in claim 31 which further includes the step of admixing a humectant with the product of step C in an amount of from about 1 to about 12 parts per 100 parts of full fat soy flour.

34. The process as recited in claim 33 wherein said humectant is glycerin.

35. The process as recited in claim 23 which further includes replacing for up to 50% by weight of said grain flour with corn syrup solids.

36. A whole egg extender comprising from about 60 parts to about 80 parts by weight of the product of claim 1 and from about 40 parts to about 20 parts by weight albumen, all parts being on a weight basis.

37. A whole egg replacer composition comprising from about 17.5 parts to about 52.5 parts of the product of claim 1 and from about 52.5 parts to about 17.5 parts egg yolk to about 30 parts egg albumen, all parts being on a dry weight basis.

38. An extended egg yolk composition comprising from about 25 parts to about 75 parts of the product of claim 1 and from about 75 parts to about 25 parts egg yolk, all parts being on a dry weight basis.

39. Egg yolk containing bakery goods containing as a replacement for from about 25% to 75% on a dry weight basis, the product of claim 1.

40. A liquid egg yolk extender comprising, in admixture, the product of claim 1 and an approximately equal weight of water.

41. A liquid egg yolk extender comprising, in admixture, the product of claim 16 and an approximately equal weight of water.

42. A liquid whole egg extender comprising in admixture, about 20% of the dry product of claim 1, about 20% water and about 60% albumen.

43. A liquid whole egg extender comprising in admixture about 20% of the product of claim 16, about 20% water and about 60% albumen.

44. A liquid whole egg replacer comprising, in admixture, about 20% liquid egg yolk, about 10% of the product of claim 1, about 10% water and about 60% albumen.

45. A liquid whole egg replacer comprising, in admixture, about 20% liquid egg yolk, about 10% of the product of claim 16, about 10% water and about 60% albumen.

* * * * *

UNITED STATES PATENT AND TRADEMARK OFFICE
CERTIFICATE OF CORRECTION

PATENT NO. : 4,072,764
DATED : February 7, 1978
INVENTOR(S) : William B. Chess

It is certified that error appears in the above-identified patent and that said Letters Patent are hereby corrected as shown below:

Column 6, line 10, after "to" insert -- about --.

Column 8, Table at bottom, under "Mixing Procedure", line 3, "secreal" should be -- several --;

Column 9, line 8 of top table, "Baiing" should read -- baking --.

Column 12, Claim 39, line 2, after "for" insert -- said yolk --.

Signed and Sealed this

*Fourteenth* Day of *November 1978*

[SEAL]

*Attest:*

RUTH C. MASON
*Attesting Officer*

DONALD W. BANNER
*Commissioner of Patents and Trademarks*